(12) United States Patent
Suzuki

(10) Patent No.: US 11,415,709 B2
(45) Date of Patent: Aug. 16, 2022

(54) RADIATION DETECTING ATTACHMENT, WORKING MACHINE, AND SORTING METHOD

(71) Applicant: SUZUKEN KOGYO CO., LTD., Fuefuki (JP)

(72) Inventor: Yasunobu Suzuki, Fuefuki (JP)

(73) Assignee: SUZUKEN KOGYO CO., LTD., Fuefuki (JP)

( * ) Notice: Subject to any disclaimer, the term of this patent is extended or adjusted under 35 U.S.C. 154(b) by 585 days.

(21) Appl. No.: 16/481,393

(22) PCT Filed: Jan. 23, 2018

(86) PCT No.: PCT/JP2018/002005
§ 371 (c)(1),
(2) Date: Jul. 26, 2019

(87) PCT Pub. No.: WO2018/139456
PCT Pub. Date: Aug. 2, 2018

(65) Prior Publication Data
US 2019/0391279 A1    Dec. 26, 2019

(30) Foreign Application Priority Data

Jan. 26, 2017    (JP) .............................. JP2017-012530

(51) Int. Cl.
*G21C 17/04* (2006.01)
*G01T 1/167* (2006.01)
(Continued)

(52) U.S. Cl.
CPC ................ *G01T 1/167* (2013.01); *B02C 1/06* (2013.01); *E02F 3/3609* (2013.01); *E02F 9/264* (2013.01); *G01T 7/08* (2013.01); *G21F 9/30* (2013.01)

(58) Field of Classification Search
CPC .. G01T 1/167; G01T 7/08; G01T 7/00; B02C 1/06; E02F 3/3609; E02F 9/264;
(Continued)

(56) References Cited

U.S. PATENT DOCUMENTS 5,015,847 A    5/1991  Rouillon
5,330,142 A    7/1994  Gnau, III
(Continued)

FOREIGN PATENT DOCUMENTS

EP    0388568 A2 *  12/1989
EP    2 503 062 A2   9/2012
(Continued)

OTHER PUBLICATIONS

Apr. 3, 2018 International Search Report issued in International Patent Application PCT/JP2018/002005.
(Continued)

*Primary Examiner* — Kiho Kim
(74) *Attorney, Agent, or Firm* — Oliff PLC

(57) ABSTRACT

A radiation detecting attachment comprising four radiation detectors configured to detect radiation from an object of detection W, attached removably to a working machine, wherein the radiation detecting attachment is supported by the working machine movably when the radiation detecting attachment is attached to the working machine, and is supported by an arm body of the working machine swingably, and a distance between the radiation detectors and the other radiation detectors is changeable. This makes it possible to use the radiation detectors efficiently and in a versatile manner.

19 Claims, 9 Drawing Sheets

(51) Int. Cl.
*B02C 1/06* (2006.01)
*E02F 3/36* (2006.01)
*E02F 9/26* (2006.01)
*G01T 7/08* (2006.01)
*G21F 9/30* (2006.01)

(58) Field of Classification Search
CPC ...... E02F 3/36; E02F 9/26; G21F 9/30; E04G 23/02; E04G 23/08
See application file for complete search history.

(56) References Cited

U.S. PATENT DOCUMENTS

| | | |
|---|---|---|
| 6,448,564 B1 | 9/2002 | Johnson et al. |
| 8,515,628 B2 | 8/2013 | Bettany et al. |
| 2012/0245803 A1 | 9/2012 | Bettany et al. |
| 2013/0085788 A1 | 4/2013 | Rowlan |

FOREIGN PATENT DOCUMENTS

| | | |
|---|---|---|
| EP | 2921589 A1 | 9/2015 |
| JP | S55-53448 U | 4/1980 |
| JP | H08-94399 A | 4/1996 |
| JP | 2012-229945 A | 11/2012 |
| JP | 2013-92438 A | 5/2013 |
| JP | 2014-20900 A | 2/2014 |
| JP | 2014-104435 A | 6/2014 |
| JP | 2015-175137 A | 10/2015 |

OTHER PUBLICATIONS

Oct. 8, 2020 Extended Search Report issued in European Patent Application No. 18744169.6.

Jun. 10, 2022 Office Action issued in European Patent Application No. 18744169.6.

* cited by examiner

RADIATION DETECTING ATTACHMENT, WORKING MACHINE, AND SORTING METHOD

TECHNICAL FIELD

The present invention relates to a radiation detecting attachment, a working machine, and a sorting method.

BACKGROUND ART

Patent Literature 1 discloses a working machine including a radiation detector for detecting radiation. In this working machine, the radiation detector is attached to an arm body that supports a bucket (working attachment) movably, and radiation of an object of detection in the bucket can be detected.

CITATION LIST

Patent Literature

Patent Literature 1: Japanese Patent Application Laid-Open No. 2012-229945

SUMMARY OF INVENTION

Technical Problem

In the configuration as shown in Patent Literature 1, however, an object of detection that can be detected by the radiation detector is limited to an object in the bucket. That is, since a size of the object of detection and a distance to the object of detection are limited in Patent Literature 1, it is difficult to use such a radiation detector in a versatile manner.

In light of this, the present invention has been made to solve the aforementioned problem. An object of the present invention is to provide a radiation detecting attachment, a working machine, and a sorting method capable of using a radiation detector efficiently and in a versatile manner.

Solution to Problem

The present invention has solved the aforementioned problem by providing a radiation detecting attachment including one or more radiation detectors configured to detect radiation from an object of detection, attached removably to a working machine, in which the radiation detecting attachment is supported by the working machine movably when the radiation detecting attachment is attached to the working machine, when a plurality of the radiation detectors are included, the radiation detecting attachment includes a frame body supporting the plurality of the radiation detectors, and a distance between at least one radiation detector and another radiation detector is changeable by moving of a moving element included the frame body. Or, the present invention has solved the aforementioned problem by providing a radiation detecting attachment including one or more radiation detectors configured to detect radiation from an object of detection, attached removably to a working machine, in which the radiation detecting attachment is supported by the working machine movably when the radiation detecting attachment is attached to the working machine, including a plurality of claw members capable of coming closer to each other and separating from each other.

That is, in the present invention, the radiation detecting attachment including the one or more radiation detectors is removably attached to the working machine. Furthermore, the radiation detecting attachment is supported by the working machine movably. This imposes less limitation on the size of the object of detection and enables a distance to the object of detection and a positional relationship with the object of detection to be adjusted appropriately.

The radiation detecting attachment may be supported by an arm body of the working machine swingably. In this case, the positional flexibility of the radiation detecting attachment can be further broadened.

When a plurality of the radiation detectors are included, the radiation detecting attachment may include a frame body supporting the plurality of the radiation detectors, and a distance between at least one radiation detector and another radiation detector is changeable by moving of a moving element included the frame body. In this case, radiation can be detected efficiently by changing a clearance between the radiation detectors in accordance with a size of the object of detection.

Or, a plurality of claw members capable of coming closer to each other and separating from each other may be included. In this case, a distance to the object of detection can be stabilized and the object of detection can be accurately identified for the detected amount of radiation by grasping the object of detection with the claw members, for example.

At least one of the radiation detectors may be supported via an elastic member. In this case, the possibility of causing failure, breakage, or the like, of the radiation detector can be reduced even if a large external force is applied to the radiation detector.

One or more discharge nozzles disposed to be capable of replacing pre-replacement air between the radiation detector and a detection area of the object of detection may be included, and post-replacement air having a reduced amount of a radioactive substance contained in the pre-replacement air may be discharged from the one or more discharge nozzles. In this case, an amount of radiation from the object itself of detection can be accurately detected by reducing the influence of an air dose.

The present invention can be viewed as a working machine to which the above-described radiation detecting attachment is attached.

In the working machine, a driver's cab may be equipped with a display device capable of displaying an amount of radiation based on an output of the radiation detector. In this case, an operator in the driver's cab can directly check the amount of radiation.

In the working machine, the display device can display mapping associating the amount of radiation with the detection area of the object of detection. In this case, a level of the amount of radiation can be determined for each detection area. Therefore, in demolishing the object of detection, a required space to dispose waste resulting from the demolition, its demolition procedure, or the like can be predicted before starting the demolition. That is, there is no need to separately check the demolition procedure or the amounts of radiation after the demolition, thereby enabling an improvement in working efficiency.

The present invention can be viewed as a sorting method for sorting, with a radiation detecting attachment including one or more radiation detectors configured to detect radiation from an object of detection, attached removably to a working machine, the object of detection on the basis of an amount of the radiation, the method including: a step of supporting the radiation detecting attachment by the working machine and bringing the radiation detecting attachment closer to each of detection areas of the object of detection; a step of obtaining an amount of radiation of the detection area on the basis of an output of the radiation detector; a step of detaching the radiation detecting attachment from the working machine and attaching a working attachment, capable of dividing the object of detection into each of the detection areas, to the working machine; and a step of dividing the object of detection with the working attachment in accordance with the obtained amount of radiation.

The sorting method may include a step of replacing pre-replacement air between the radiation detector and the detection area with post-replacement air having a reduced amount of a radioactive substance contained in the pre-replacement air before obtaining the amount of radiation of the detection area.

The sorting method may include a step of displaying mapping associating the obtained amount of radiation with the detection area.

The sorting method includes: a step of detaching the radiation detecting attachment from the working machine and attaching a working attachment, capable of dividing the object of detection into each of the detection areas, to the working machine; and a step of dividing the object of detection with the working attachment in accordance with the obtained amount of radiation. Then, since a vehicle body itself of the working machine is shared, the object of detection can be easily sorted even in a narrow working site.

Or, when the radiation detecting attachment includes a plurality of claw members capable of coming closer to each other and separating from each other, the sorting method includes a step of dividing the object of detection with the working attachment in accordance with the obtained amount of radiation. Then, no other working machine is required, and replacement work between the radiation detecting attachment and the working attachment can be eliminated. Thus, the object of detection can be quickly sorted even in a narrow working site.

The present invention can be viewed as a sorting method for sorting, with a radiation detecting attachment including one or more radiation detectors configured to detect radiation from an object of detection, attached removably to a working machine, the object of detection on the basis of an amount of the radiation, the method including: a step of preparing a conveying unit capable of conveying a plurality of the objects of detection; a step of detaching the radiation detecting attachment from the working machine and disposing the radiation detecting attachment near the conveying unit so that radiation of the plurality of the objects of detection moving on the conveying unit can be detected sequentially; and a step of obtaining an amount of radiation for each of the plurality of the objects of detection moving on the conveying unit.

The sorting method may include a step of replacing, when obtaining the amount of radiation for each of the objects of detection, pre-replacement air between the radiation detector and the object of detection with post-replacement air having a reduced amount of a radioactive substance contained in the pre-replacement air.

The sorting method may include: a step of detaching the radiation detecting attachment from the working machine and attaching a working attachment, capable of supporting the object of detection, to the working machine; and a step of disposing the plurality of the objects of detection on the conveying unit with the working attachment in order to detect the radiation. In this case, since a vehicle body itself of the working machine is shared, the objects of detection can be easily disposed on the conveying unit even in a narrow working site.

When the working machine simultaneously includes the radiation detecting attachment and a working attachment capable of supporting the object of detection, the sorting method may include a step of disposing the plurality of the objects of detection on the conveying unit with the equipped working attachment in order to detect the radiation. In this case, no other working machine is required, and replacement work between the radiation detecting attachment and the working attachment can be eliminated. Thus, the object of detection can be easily moved from the conveying unit and sorted even in a narrow working site.

The sorting method may include a step of displaying the obtained amount of radiation for each of the objects of detection. In this case, the object of detection can be easily sorted in accordance with the amount of radiation.

The sorting method may include a step of sorting the object of detection with the working attachment in accordance with the obtained amount of radiation. In this case, since a vehicle body itself of the working machine is shared, the object of detection can be easily moved from the conveying unit and sorted even in a narrow working site.

Advantageous Effects of Invention

According to the present invention, the radiation detector can be used efficiently and in a versatile manner.

DESCRIPTION OF EMBODIMENTS

An example of a first embodiment of the present invention will be described below in detail with reference to the drawings.

First, a configuration of a working machine 100 according to the present embodiment will be described with reference to FIG. 1. Note that the working machine 100 can be used in the demolition industry, the forest industry, the scrap industry, the waste treatment industry, decontamination work, or the like in an environment with a risk of the presence of radiation due to a radioactive substance or the like leaked from a nuclear power plant or the like.

Figure 1:
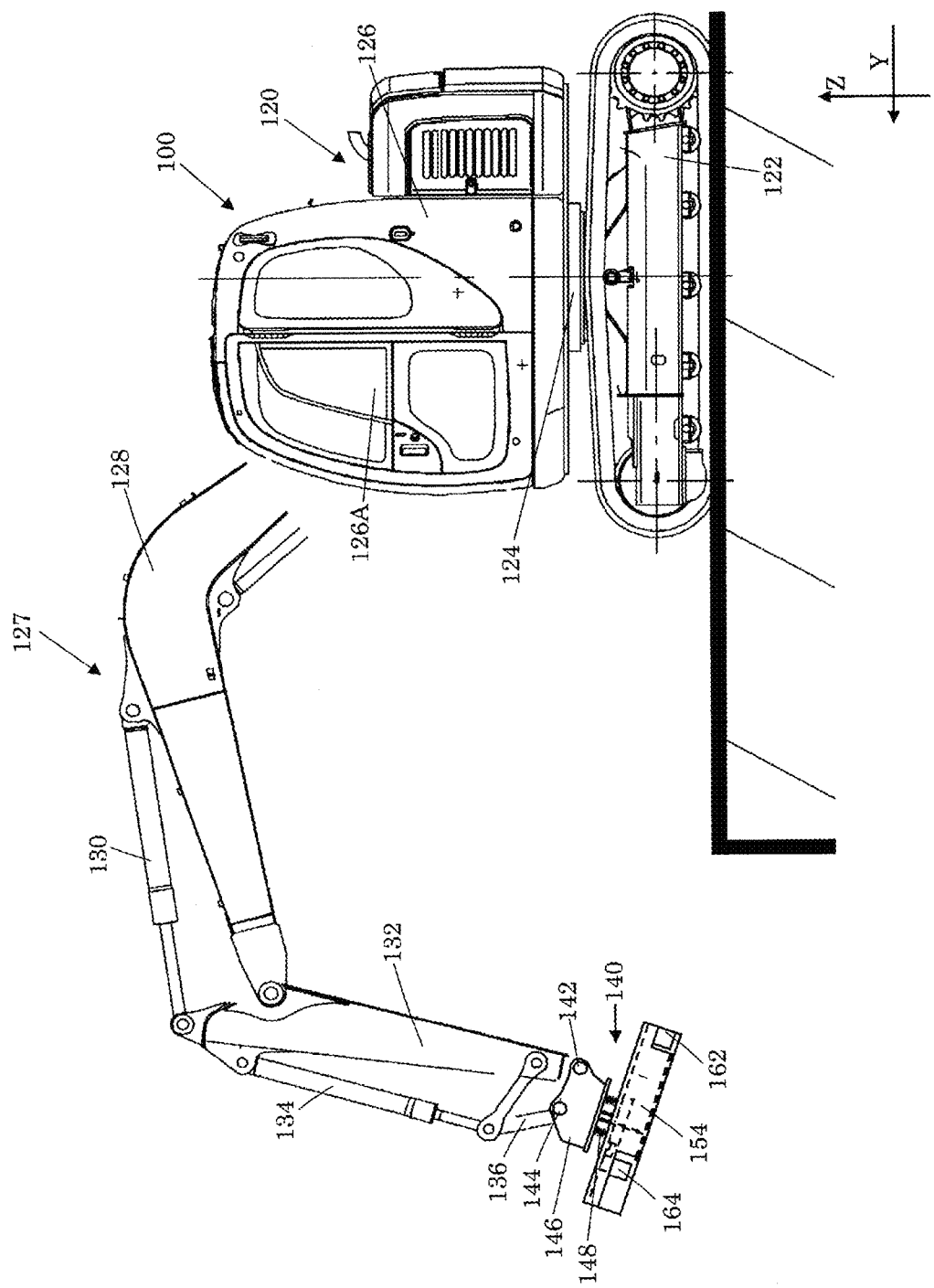
FIG. 1 is a schematic view showing a working machine according to a first embodiment of the present invention.

As shown in FIG. 1, the working machine 100 includes a vehicle body 120, an arm body 127, and a radiation detecting attachment 140. The vehicle body 120 includes a crawler-type traveling body 122, a turning mechanism 124, and a turning body 126. The turning body 126 is configured to be rotatable to the traveling body 122 by the turning mechanism 124. A driver's cab 126A is established in the turning body 126. The driver's cab 126A is sealably configured so that radiation can be shielded appropriately while blocking rain and wind. The driver's cab 126A can also be temperature-controlled by an air conditioner. That is, an operator of the working machine 100 can operate the working machine 100 in a stable manner without being greatly influenced by its working environment. Note that the driver's cab 126A has a processing device 170 configured to process outputs from radiation detectors 162 and 164, and a display device 180 configured to display the processing results produced by the processing device 170 (that is, the driver's cab 126A is equipped with the display device 180 capable of displaying an amount of radiation based on the outputs of the radiation detectors 162 and 164). The processing device 170 and the display device 180 will be described later. Note that the working machine 100 may be configured such that the working machine 100 is operated remotely from the outside of the vehicle by air and the operator checks the outputs of the radiation detectors from the outside of the vehicle (alternatively, the working machine 100 may be unmanned by means of programming, AI, or the like). The arm body 127 capable of swinging up and down is attached to the turning body 126. An air compressor (not shown) is installed in the turning body 126. An air inlet of the air compressor is provided with an air filter to be able to filter out a radioactive substance wafting through the air.
Compressed air provided by the air compressor is supplied, via the arm body 127, to the radiation detecting attachment 140 supported by the arm body 127. While the supply timing of the compressed air is determined by the operator, such timing may automatically coincide with the start of the detection by the radiation detectors 162 and 164.

As shown in FIG. 1, the arm body 127 includes a boom 128 attached to the turning body 126, and an arm 132 attached to a leading end of the boom 128. The arm 132 is configured to be swingable by a cylinder mechanism 130. The radiation detecting attachment 140 is attached removably to a leading end of the arm 132 (that is, the radiation detecting attachment 140 is attached removably to the working machine 100 and supported by the working machine 100 movably (in such a way as to be capable of moving) when the radiation detecting attachment is attached to the working machine). The radiation detecting attachment 140 is configured to be capable of swinging by a cylinder mechanism 134 via a link mechanism 136 (that is, the radiation detecting attachment 140 is supported by the arm body 127 of the working machine 100 swingably (in such a way as to be capable of swinging)). Note that the cylinder mechanisms 130 and 134 are driven by hydraulic pressure provided by the vehicle body 120 (the same applies also to a cylinder mechanism 160 to be described later).

Figure 2A:
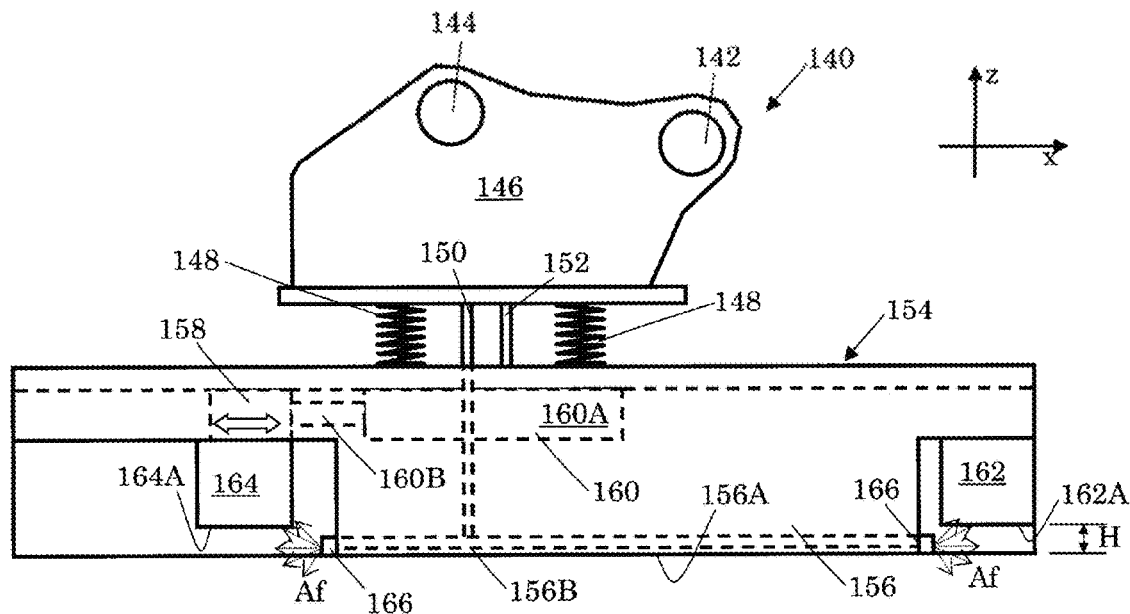
FIG. 2A is a schematic side view showing a radiation detecting attachment used in the working machine of FIG. 1.
Figure 2B:
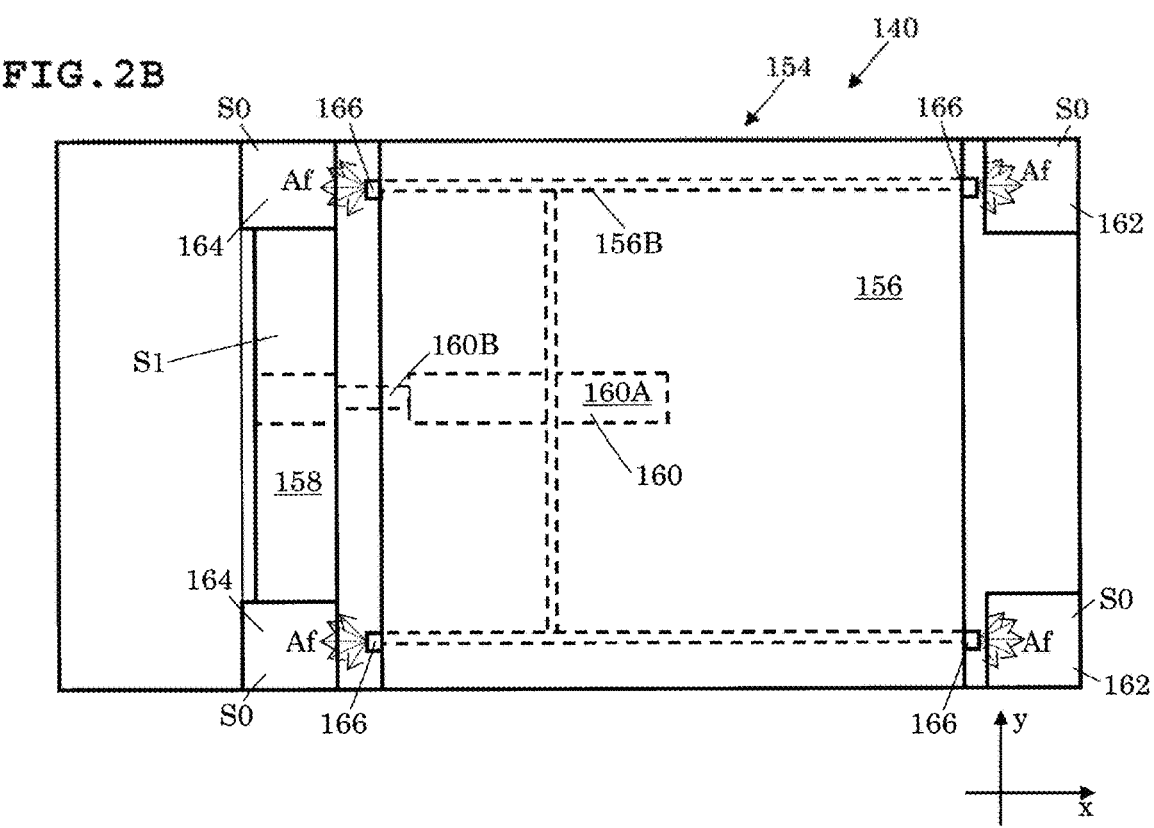
FIG. 2B is a schematic bottom view showing radiation detecting attachment used in the working machine of FIG. 1.

Next, the radiation detecting attachment 140 will be described mainly with reference to FIGS. 2A and 2B.

The radiation detecting attachment 140 includes: a bracket 146; a frame body 154 supported by the bracket 146 via a plurality of coil springs (elastic members) 148; and four radiation detectors 162 and 164 supported by the frame body 154 for detecting radiation from an object W of detection. That is, the radiation detecting attachment 140 supports the four radiation detectors 162 and 164 via the coil springs 148. Note that the four radiation detectors 162 and 164 may each be provided with a collimator (not shown) for blocking external noise.

The bracket 146 is provided with a pivot shaft 142 and a link shaft 144. The pivot shaft 142 engages with the aforementioned arm 132, and the link shaft 144 engages with the aforementioned link mechanism 136. Thus, the bracket 146 is driven to be swingable around the pivot shaft 142. The coil springs 148 are provided at a leading end of the bracket 146, and the frame body 154 is attached to the bracket 146 via the coil springs 148.

The frame body 154 includes: a casing 156 fixed to and supported by the coil springs 148; and a moving element 158 supported by the casing 156 movably. The cylinder mechanism 160 is disposed in the casing 156. A cylinder element 160A of the cylinder mechanism 160 is fixed to the casing 156, and a piston element 160B of the cylinder mechanism 160 supports the moving element 158. This makes the moving element 158 movable in an x-direction in FIGS. 2A and 2B. Note that the casing 156 provide with a flow channel 156B communicated with an air pipe 150, and the flow channel 156B is communicated with four discharge nozzles 166. A hydraulic pipe 152 is communicated with the cylinder mechanism 160.

The radiation detectors 162 and 164 are, for example, scintillation detectors utilizing a fluorescence action of NaI or the like, and are capable of outputting a detected amount of radiation. Detection surfaces 162A and 164A of the radiation detectors 162 and 164 face the negative side in a z-direction. The radiation detectors 162 are disposed at two corners of the casing 156, and the radiation detectors 164 are disposed at both ends of the moving element 158. Thus, a distance between the radiation detectors 162 and the radiation detectors 164 is changeable (can be modified) by the cylinder mechanism 160. A lower surface 156A of the casing is protruded more than the detection surfaces 162A and 164A by a distance H, thereby providing a level difference between the lower surface 156A of the casing and the detection surfaces 162A and 164A. As a result, even when the lower surface 156A of the casing is brought into contact with the object W of detection in a case where the object W of detection has a planar shape, a gap corresponding to the distance H can be provided between the detection surfaces 162A and 164A of the radiation detectors 162 and 164 and a surface of the object W of detection. That is, the provision of such a level difference can reduce the risk of direct collision with the object W of detection, thereby preventing the failure or breakage of the radiation detectors 162 and 164 due to the external force (the present invention is not limited thereto, and no such a level difference may be provided). In the regions of this level difference, the discharge nozzles 166 for discharging, to the detection surfaces 162A and 164A, the compressed air supplied from the vehicle body 120 are provided. More specifically, the radiation detecting attachment 140 is configured to include the four discharge nozzles 166 disposed to be capable of replacing pre-replacement air Ab between the radiation detectors 162 and 164 and a detection area MA of the object W of detection. And, the four discharge nozzles 166 are configured to discharge post-replacement air Af having a reduced amount of the radioactive substance contained in the pre-replacement air Ab. In the present embodiment, the radiation detectors 162 and 164 are connected to the processing device 170 and the display device 180 via a wireless communication unit (not shown) (this may be implemented via wire communication). The wireless communication unit enables the operator to start and end the detection of the radiation detectors 162 and 164. The operator can also check the outputs of the radiation detectors 162 and 164 in the driver's cab 126A. Since the outputs are provided via wireless communication in the present embodiment, the radiation detectors 162 and 164 can be disposed at positions suitable for the detection without being limited by wire routing. Note that a power supplied from the vehicle body 120 may be used, or a dedicated rechargeable battery may be used as a power source for the radiation detectors 162 and 164 and the wireless communication unit. While the radiation detectors 162 and 164 have exposed detection surfaces 162A and 164A in the present embodiment, the present invention is not limited thereto. The radiation detectors 162 and 164 may each include a shock absorbing member for protecting the detection surface thereof on the detection surface, or the radiation detectors 162 and 164 may be configured to expose the detection surfaces only at the start of the detection.

Figure 3:
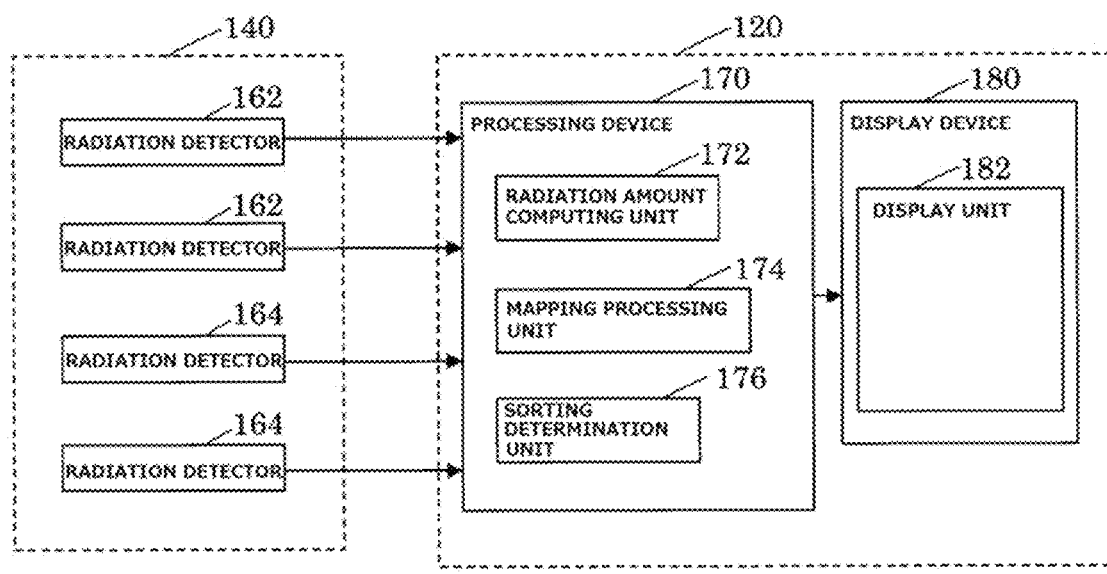
FIG. 3 is a block diagram showing relationships among radiation detectors, a processing device, and a display device used in the working machine of FIG. 1.

Next, the radiation detectors 162 and 164, the processing device 170, and the display device 180 will be described mainly with reference to FIG. 3. Note that input unit (not shown) is provided in the processing device 170, thereby allowing the operator to instruct the radiation detectors 162 and 164 to start and end the detection.

The processing device 170 receives data on the amounts of radiation detected by the radiation detectors 162 and 164 via the wireless communication unit (not shown) and performs various types of arithmetic processing thereon. Specifically, the processing device 170 includes a radiation amount computing unit 172, a mapping processing unit 174, and a sorting determination unit 176.

The radiation amount computing unit 172 obtains a total amount of radiation Ct that can be detected by the entire radiation detecting attachment 140 on the basis of a positional relationship of the radiation detectors 162 and 164. For example, it is assumed that an area of each of the detection surfaces 162A and 164A of the radiation detectors 162 and 164 is S0, an area (referred to as a total detection area) surrounded by the radiation detectors 162 and 164 is S1, and amounts of radiation detected by the radiation detectors 162 and 164 are C1, C2, C3, and C4. In this case, the radiation amount computing unit 172 can obtain the total amount of radiation Ct that can be detected by the total detection area S1 according to Expression (1).

$$Ct=(C1+C2+C3+C4)/4/S0*S1 \tag{1}$$

That is, in the radiation detecting attachment 140, the total detection area S1 can be changed (modified) by moving the moving element 158 so that the detection surface is modified to have a size suitable for the object W of detection. Note that the position of the moving element 158 can be obtained by monitoring a supplied oil amount for driving the cylinder mechanism 160 (or an encoder or the like).

When the object W of detection is in an individually-separated form (such as a flexible container pack FP to be described later), the radiation amount computing unit 172 can obtain a specific amount of radiation Ci of the object W of detection by inputting a proportion of the total detection area S1 that covers the entire object W of detection (such as a solid angle).

The mapping processing unit 174 connects the total amount of radiation Ct to the detection area MA of the object W of detection. For example, a positioning device (navigation system) for pinpointing the current location on a map on the basis of a GPS signal is incorporated into the working machine 100. The mapping processing unit 174 can develop the map data. The mapping processing unit 174 further connects, to the map, data on the shapes of individual structures (such as private houses, apartment houses, public facilities and utilities, and infrastructural facilities and utilities) obtained by a laser scanner or a camera (2D or 3D), or from design data (the data on the shapes of individual structures may be inputted in the form of electronic data via an external interface provided in the processing device 170). The mapping processing unit 174 performs mesh processing on the data on the shapes of the individual structures according to the detection area MA having a size corresponding to the total detection area S1 of the radiation detecting attachment 140. The mapping processing unit 174 then assigns the total amount of radiation Ct to the detection area MA corresponding to the detection position of the radiation detecting attachment 140. The detection position of the radiation detecting attachment 140 in this case can be obtained by monitoring a supplied oil amount for driving each cylinder mechanism (or an encoder or the like). Needless to say, the operator himself or herself may manually determine the detection area MA corresponding to the detection position of the radiation detecting attachment 140. Thus, the mapping processing unit 174 can obtain radiation amount distributions ranging from a radiation amount distribution in a specific individual structure to a radiation amount distribution over a wide range such as a district or a region.

The sorting determination unit 176 determines whether the total amount of radiation Ct or the specific amount of radiation Ci exceeds a reference amount Cb of radiation. Based on the determination result, the sorting determination unit 176 changes the display information and gives a guidance for after treatment. When the specific amount of radiation Ci exceeds the reference radiation amount (e.g., 8000 becquerel per 1 Kg) in unit mass, for example, it is determined as radioactive waste by the sorting determination unit 176. Mass data may be estimated in each dividable weight of the object W of detection, or may use outputs of a weight sensor such as a load cell (the weight sensor may be incorporated into a part of a grapple GP or a conveyor BC). Note that the total amount of radiation Ct may be used for sorting determination by converting it in terms of unit area.

The display device 180 is connected to the processing device 170 and capable of directly displaying the amounts of radiation detected by the individual radiation detectors 162 and 164 at a display unit 182 thereof. Simultaneously, the display unit 182 can also display the results obtained by the radiation amount computing unit 172, the mapping processing unit 174, and the sorting determination unit 176 (that is, mapping associating the amount of radiation with the detection area MA of the object W of detection can be displayed at the display device 180). These results may be displayed not only in numerical values but also by color coding. Note that the display device 180 may also serve as a display device for the positioning device.

Next, a sorting procedure of sorting the object W of detection based on the amount of radiation with the radiation detecting attachment 140 will be described with reference to FIGS. 4 and 5. Note that the object W of detection in this case is a structure BB to be demolished, which is shown in FIG. 4.

Figure 5:
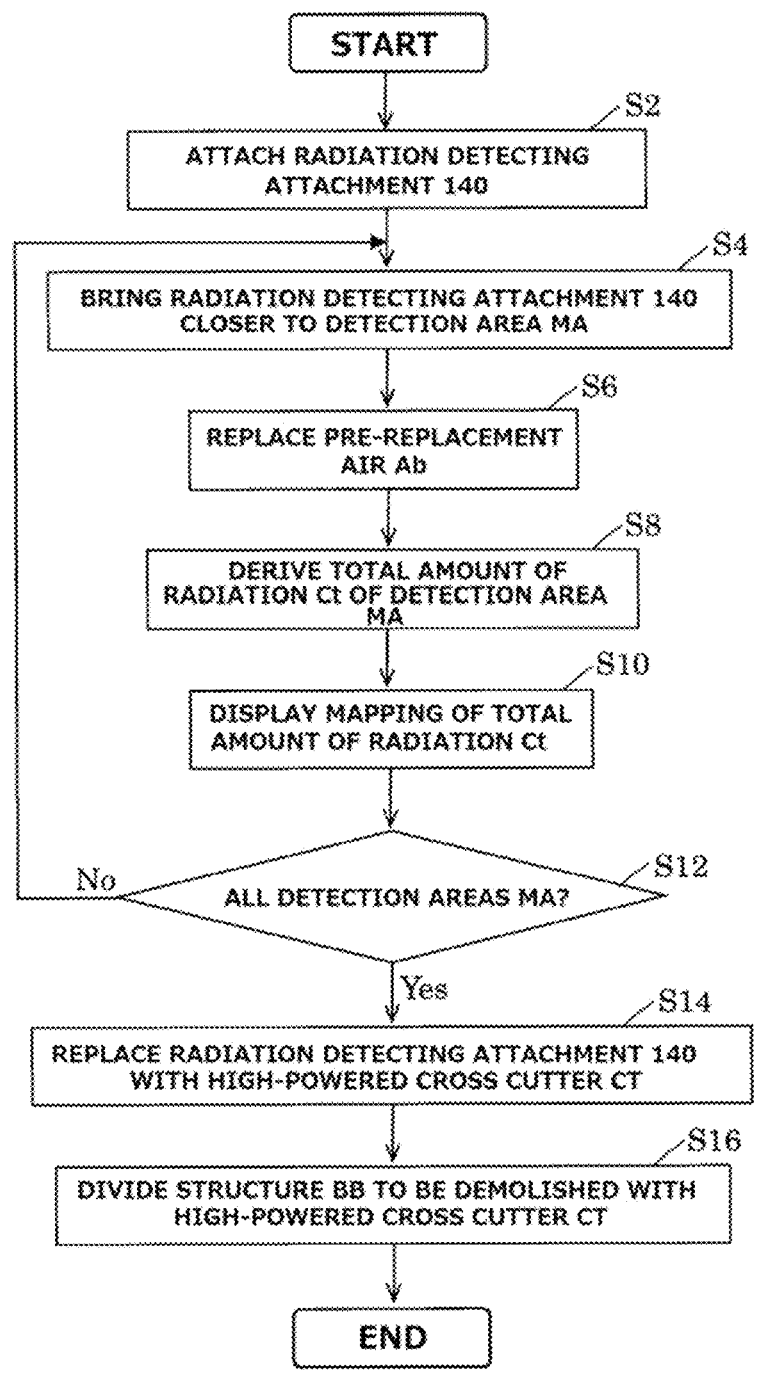
FIG. 5 is a flow diagram for describing a procedure from the radiation detection to the division in the structure to be demolished, which is shown in FIG. 4.

First, the radiation detecting attachment 140 is attached to the working machine 100 (Step S2 in FIG. 5). The radiation detecting attachment 140 is then brought closer to the detection area MA (Step S4 in FIG. 5). More specifically, the radiation detecting attachment 140 is supported by the working machine 100, and the radiation detecting attachment 140 is brought closer to the detection area MA of the structure BB to be demolished. At this time, the lower surface of the frame body 154 (the lower surface 156A of the casing) in the radiation detecting attachment 140 is brought into contact with the detection area MA.

Next, the pre-replacement air Ab is replaced by causing the discharge nozzles 166 to discharge the compressed air (Step S6 in FIG. 5). More specifically, the pre-replacement air Ab (present) between the radiation detectors 162 and 164 and the detection area MA is replaced by the post-replacement air Af having a reduced amount of the radioactive substance contained in the pre-replacement air Ab before obtaining the amount of radiation of the detection area MA.

Figure 4A:
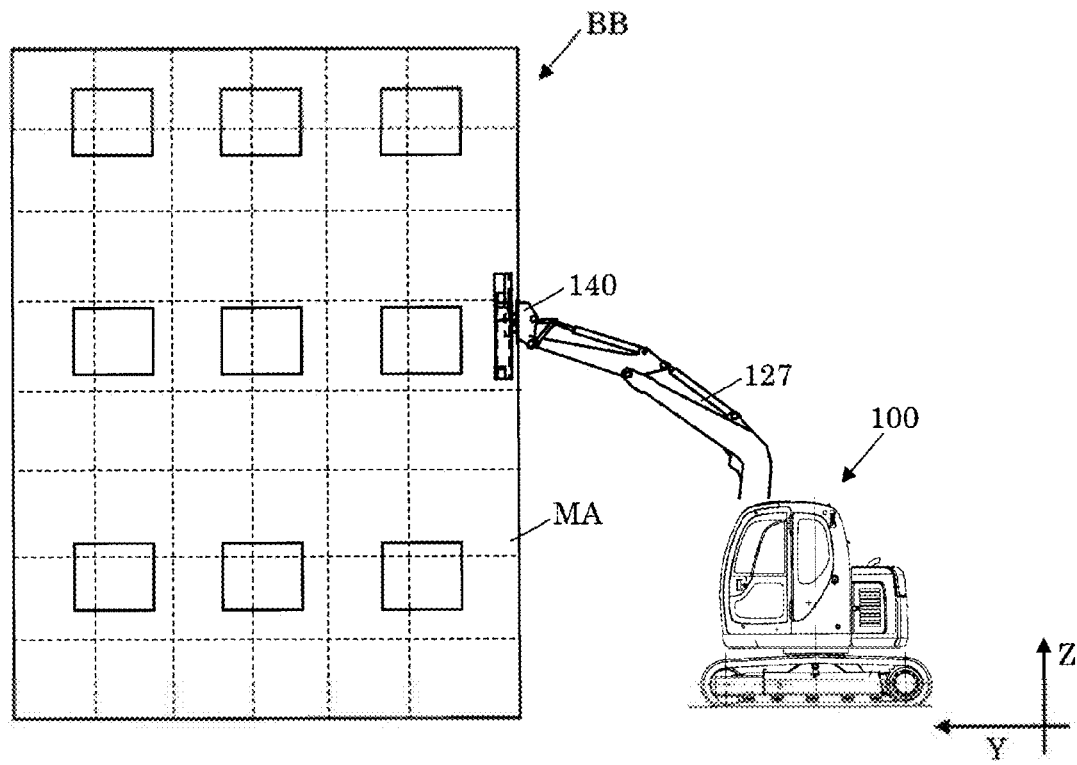
FIG. 4A is a schematic view showing radiation detection with the working machine in a structure to be demolished.

Next, the total amount (amount) of radiation Ct of the detection area MA is obtained (FIG. 4A and Step S8 in FIG. 5). More specifically, the total amount of radiation Ct of the detection area MA corresponding to the total detection area S1 is obtained by the radiation amount computing unit 172 on the basis of the outputs of the radiation detectors 162 and 164. Thereafter, the total amount of radiation Ct is connected to the detection area MA by the mapping processing unit 174.

Next, mapping associating the obtained total amount of radiation Ct with the detection area MA is displayed at the display device 180 (Step S10 in FIG. 5).

Next, it is determined whether all detection areas MA have been subjected to the detection. If the detection on the all detection areas MA has not been finished yet (No in Step S12 in FIG. 5), the detection is started on another detection area MA (Steps S4 to S10 in FIG. 5).

If the all detection areas MA have been subjected to the detection (Yes in Step S12 in FIG. 5), the radiation detecting attachment 140 is replaced by high-powered cross cutter (coarse crushing equipment: working attachment) CT (Step S14 in FIG. 5). More specifically, the radiation detecting attachment 140 is detached from the working machine 100, and the high-powered cross cutter CT, capable of dividing the structure BB to be demolished into each of the detection areas MA, is attached to the working machine 100 (this transforms the working machine 100 into a working machine 101).

Figure 4B:
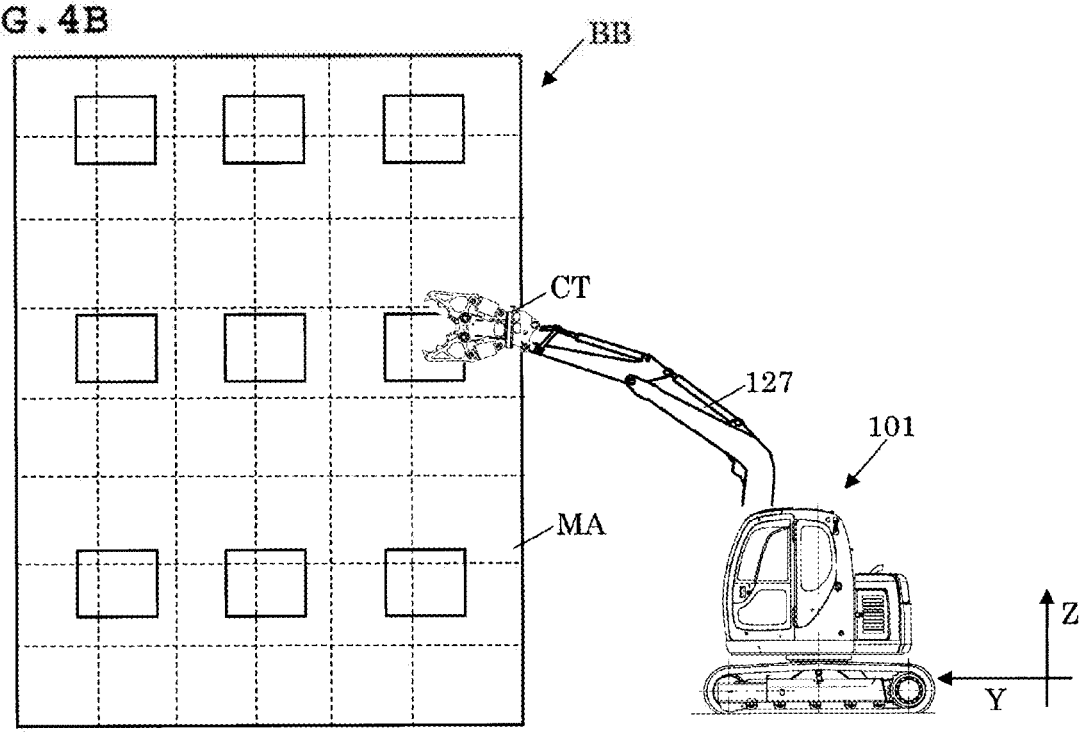
FIG. 4B is a schematic view showing the division with the working machine in a structure to be demolished.

Next, the structure BB to be demolished is divided with the high-powered cross cutter CT (FIG. 4B and Step S16 in FIG. 5). More specifically, the structure BB to be demolished is divided with the high-powered cross cutter CT in accordance with the obtained total amounts of radiation Ct. Once divided, the segments of the structure BB to be demolished, having been divided in accordance with the level of the total amounts of radiation Ct, are placed at different locations in order to prevent a level of the total amount of radiation Ct mixing with one another. Also with regard to the dividing procedure, segments of the structure BB to be demolished, having equivalent total amounts of radiation Ct, are divided together as much as possible in accordance with the total amounts of radiation Ct. Note that a mechanism for discharging water jet capable of dividing the structure BB to be demolished into each of the detection areas MA may be attached to the working machine in place of the high-powered cross cutter CT.

As just described, by using the radiation detecting attachment 140 in the demolition of the structure BB to be demolished, the distribution of the amounts of radiation for all of the structure BB to be demolished can be found out before the demolition work. This allows for efficient demolition work and quick sorting.

The radiation detecting attachment 140 is detached from the working machine 100, high-powered cross cutter CT is attached to the working machine 100, and the structure BB to be demolished is divided with the high-powered cross cutter CT in accordance with the obtained total amounts of radiation Ct. Therefore, the vehicle body 120 itself of the working machine 100 is shared with the working machine 101. Thus, the structure BB to be demolished can be easily sorted even in a narrow working site.

Next, a sorting procedure of sorting another object W of detection on the basis of an amount of radiation with the radiation detecting attachment 140 will be described with reference to FIGS. 6 and 7. Note that the object W of detection in this case is a flexible container pack FP shown in FIG. 6C. The flexible container pack FP contains, for example, contaminated soil, contaminated plants, or the like resulting from decontamination work, or contaminated waste produced by demolition work or the like.

Figure 6A:
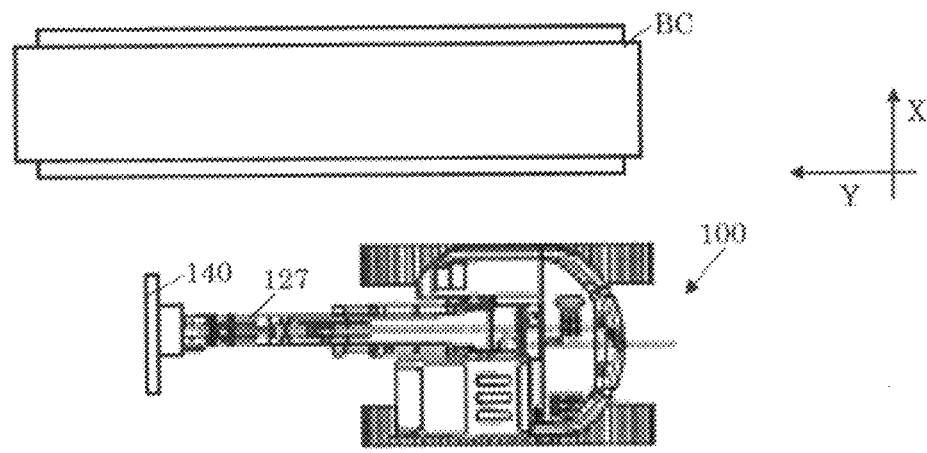
FIG. 6A is a schematic view showing a conveyor and the working machine with the radiation detecting attachment.
Figure 7:
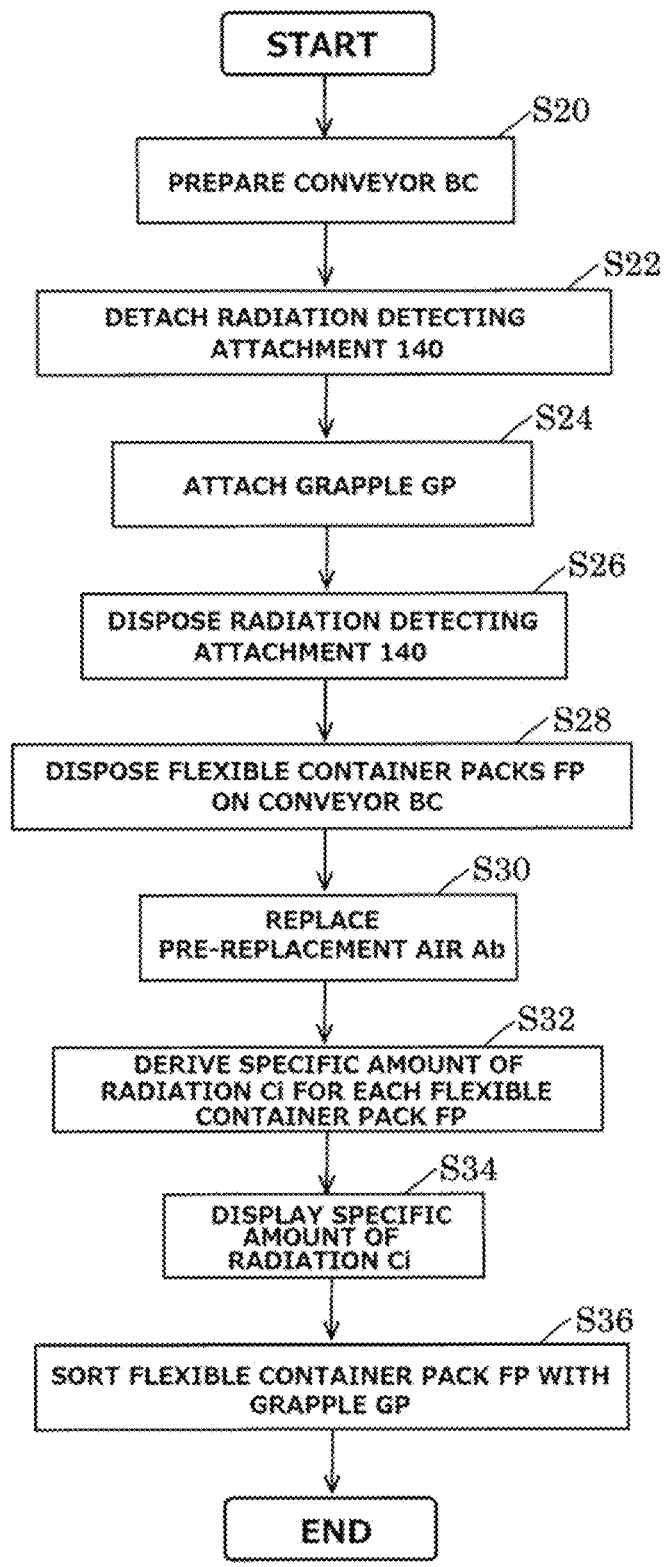
FIG. 7 is a flow diagram for describing a procedure from the preparation of the conveyor belt to the sorting of the flexible container packs, which is shown in FIG. 6.

First, a conveyor (conveying unit) BC capable of conveying a plurality of flexible container packs FP is prepared (FIG. 6A and Step S20 in FIG. 7). At this time, a proportional rate of the radiation detecting attachment 140 that covers the flexible container pack FP is inputted to the processing device 170, for example. While the conveyor BC moves the flexible container pack FP simply in one direction without changing its physical orientation in the present embodiment, the present invention is not limited thereto. The conveyor BC may be configured to move the flexible container pack FP in one direction while rotating the flexible container pack FP and to cause the flexible container pack FP to be constantly in contact with one end of the conveyor BC (the side on which the radiation detecting attachment 140 is disposed).

Next, the radiation detecting attachment 140 is detached from the working machine 100 (Step S22 in FIG. 7). Thereafter, the grapple GP capable of supporting the flexible container pack FP is attached to the working machine 100 (Step S24 in FIG. 7). This transforms the working machine 100 into a working machine 102. Note that the grapple GP is provided with a weight sensor and thus includes a configuration for measuring a weight of the supported flexible container pack FP and sending the measured result to the processing device 170 (the working attachment may be a hook, or the like, capable of hanging the flexible container pack FP instead of the grapple GP).

Figure 6B:
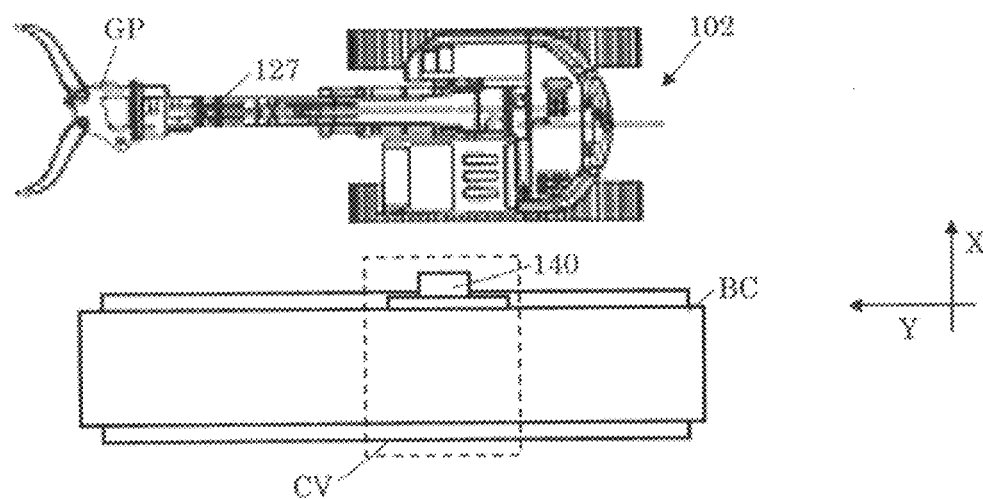
FIG. 6B is a schematic view showing the conveyor with the radiation detecting attachment and the working machine with a working attachment.

At the same time, the radiation detecting attachment 140 is disposed near the conveyor BC so that radiation of the plurality of flexible container packs FP moving on the conveyor BC can be detected sequentially (FIG. 6B and Step S26 in FIG. 7). Thereafter, the place at which the radiation detecting attachment 140 is disposed is covered with a box-shaped cover CV (The box-shaped cover CV is provided with, for example, openable and closable doors through which the flexible container pack FP can pass. More specifically, once a single flexible container pack FP moves and enters into the box-shaped cover CV, the openable and closable doors are closed. After its amount of radiation is detected, the openable and closable doors are opened so that the flexible container pack FP moves and exits from the box-shaped cover CV. Needless to say, no box-shaped cover CV may be provided.) Note that the radiation detecting attachment 140 is controlled from the working machine 102. In the present embodiment, in disposing the radiation detecting attachment 140 near the conveyor BC with the working machine 100, the radiation detecting attachment 140 is detached and installed at the same place. The present invention, however, is not limited thereto. The radiation detecting attachment 140 detached at another place may be disposed and installed near the conveyor BC with the grapple GP of the working machine 102 or by hand. While only one radiation detecting attachment 140 is disposed on one side of the conveyor BC in the present embodiment, the present invention is not limited thereto. With the use of a plurality of radiation detecting attachments, the radiation detecting attachments may be disposed on the both sides of the conveyor belt BC or above the conveyor belt BC.

Next, the conveyor BC is driven, and the plurality of flexible container packs FP are disposed on the conveyor BC with the grapple GP in order to detect radiation (Step S28 in FIG. 7). Note that the conveyor BC can be driven, for example, by remotely controlling its start, end, and conveying speed as appropriate.

Next, to detect an amount of radiation for each of the flexible container packs FP, the openable and closable doors are closed when the flexible container pack FP enters into the box-shaped cover CV, and at least the pre-replacement air Ab between the radiation detectors 162 and 164 and the flexible container pack FP is replaced by the post-replacement air Af having a reduced amount of the radioactive substance contained in the pre-replacement air Ab (Step S30 in FIG. 7). It is more preferable that the pre-replacement air Ab be replaced for all the air inside of the box-shaped cover CV.

Next, radiation is detected for each of the plurality of flexible container packs FP with the radiation detecting attachment 140. Data on the amounts of radiation is then transmitted to the processing device 170 from the radiation detecting attachment 140. The transmitted radiation amount data is processed by the radiation amount computing unit 172 of the processing device 170 to obtain a specific amount of radiation (amount) Ci for each of the flexible container packs FP (Step S32 in FIG. 7). Thereafter, the display device 180 displays the obtained specific amount of radiation Ci and its process procedure, for example, for each of the flexible container packs FP on the basis of outputs of the sorting determination unit 176 (Step S34 in FIG. 7).

Figure 6C:
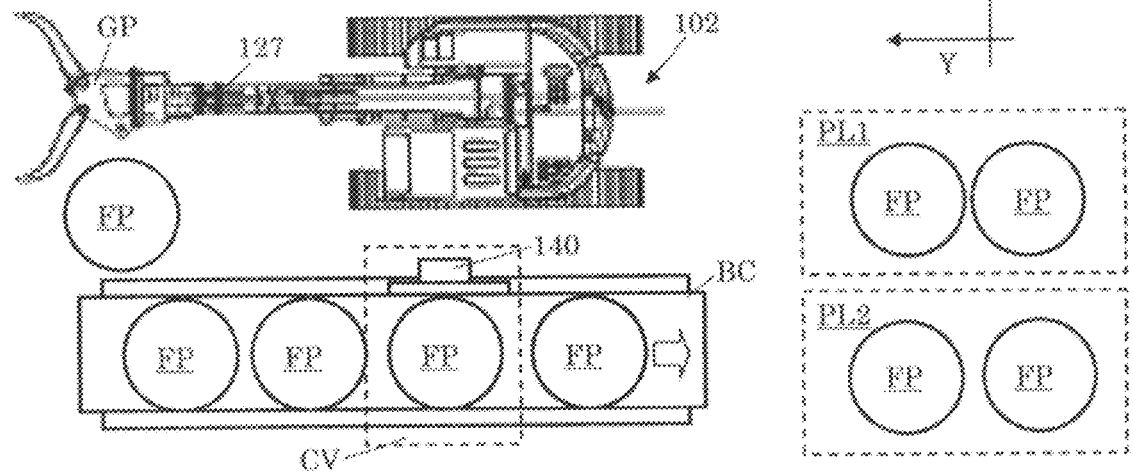
FIG. 6C is a schematic view showing the conveyor on which flexible container packs are disposed and the working machine with the working attachment which sorts the flexible container packs.

Next, the flexible container pack FP having exited from the box-shaped cover CV is sorted with the grapple GP on the basis of the obtained specific amount of radiation Ci (FIG. 6C and Step S36 in FIG. 7). For example, the working machine 102 can dispose the flexible container packs FP while varying placement locations between PL1 and PL2 depending on a level of the specific amount of radiation Ci as shown in FIG. 6C.

As just described, in evaluating amounts of radiation of the flexible container packs FP, the use of the conveyor BC and the detached radiation detecting attachment 140 enables the flexible container packs FP to be handled in a conveyor system, without the flexible container packs FP being individually moved and processed with the working machine one by one. In other words, efficient detection and sorting can be achieved in the handling of a large number of flexible container packs FP.

The radiation detecting attachment 140 is detached from the working machine 100, the grapple GP capable of supporting the flexible container pack FP is attached to the working machine 100 (this transforms the working machine 100 into the working machine 102), and the plurality of flexible container packs FP are disposed on the conveyor BC with the grapple GP in order to detect radiation. Therefore, the vehicle body 120 itself of the working machine 102 that disposes the flexible container packs FP on the conveyor BC is shared with the working machine 100 that detects and processes amounts of radiation. Thus, the flexible container packs FP can be disposed on the conveyor BC even in a narrow working site. Note that the present invention is not limited thereto. In order to achieve quick sorting for a large number of flexible container packs FP, a plurality of flexible container packs FP may be disposed on the conveyor BC with another working machine.

Furthermore, the obtained specific amount of radiation Ci is displayed for each of the flexible container packs FP. This allows the flexible container pack FP to be sorted easily in accordance with the specific amount of radiation Ci.

The object W of detection is sorted with the grapple GP in accordance with the obtained specific amount of radiation Ci. Therefore, the vehicle body 120 itself of the working machine 102 that disposes the flexible container packs FP on the conveyor BC and sorts the flexible container packs FP on the conveyor BC is shared with the working machine 102 that detects and processes amounts of radiation. Thus, the flexible container packs FP can be easily moved from the conveyor BC and sorted even in a narrow working site. Note that the present invention is not limited thereto. In order to achieve quick sorting for a large number of flexible container packs FP, a plurality of flexible container packs FP on the conveyor BC may be sorted with another working machine.

In the present embodiment, the radiation detecting attachment 140 including the four radiation detectors 162 and 164 is attached removably to the working machine 100. Furthermore, the radiation detecting attachment 140 is supported by the working machine 100 movably. This imposes less limitation on the size of the object W of detection and enables a distance to the object W of detection and a positional relationship with the object W of detection to be adjusted appropriately. Moreover, since the need for personnel to detect radiation can be eliminated, cost reduction in work in an environment with a risk of the presence of radiation due to a radioactive substance or the like leaked from a nuclear power plant or the like can be promoted.

In the present embodiment, the radiation detecting attachment 140 is supported by the arm body 127 of the working machine 100 swingably. This can further broaden the positional flexibility of the radiation detecting attachment 140.

In the present embodiment, a distance between the two radiation detectors 164 and the other two radiation detectors 162 is changeable. Thus, radiation can be detected efficiently by changing a clearance between the radiation detectors 162 and 164 in accordance with the size of the object W of detection. Note that the present invention is not limited thereto. Even when the radiation detecting attachment includes a plurality of radiation detectors, all of the radiation detectors may be fixed in place. Alternatively, when the radiation detecting attachment includes three or more radiation detectors, the radiation detectors may be movable not only in a single axial direction but also in a plurality of axial directions.

In the present embodiment, the four radiation detectors 162 and 164 are supported via the coil springs 148. This can reduce the possibility of failure, breakage, or the like, of the radiation detectors 162 and 164 even if a large external force is applied to the radiation detectors 162 and 164. Note that no coil springs may be provided. Alternatively, coil springs may be provided in the frame body so as to correspond to the radiation detectors, and the coil springs may be configured to support the radiation detectors individually. In this case, since the stiffness of the coil springs can be set lower, the breakage or failure of the radiation detectors due to collision or the like can be further prevented from occurring. Needless to say, a flat spring, a rubber material, other damper means, or the like may be used instead of the coil spring.

In the present embodiment, there are provided the four discharge nozzles 166 disposed to be capable of replacing the pre-replacement air Ab between the radiation detectors 162 and 164 and the detection area MA of the object W of detection, and the post-replacement air Af having a reduced amount of the radioactive substance contained in the pre-replacement air Ab is discharged from the four discharge nozzles 166. Thus, even in an environment with a high air dose, for example, the low-amount of radiation from the object W of detection can be detected. That is, the amount from radiation of the object W itself of detection can be accurately detected by reducing the influence of the air dose. Note that the present invention is not limited thereto. No such discharge nozzles may be provided. Alternatively, not a single but two discharge nozzles may be provided for each of the radiation detectors. Alternatively, a single discharge nozzle may be disposed to be used for all of the radiation detectors. Alternatively, the discharge nozzle may be configured to be integral with not the frame body but the radiation detector.

In the present embodiment, the driver's cab 126A is equipped with the display device 180 capable of displaying amounts of radiation based on outputs of the radiation detectors 162 and 164. Thus, an operator in the driver's cab 126A can directly check the amounts of radiation without successively moving to the position of the radiation detecting attachment 140 to check the outputs of the radiation detectors 162 and 164. Note that the present invention is not limited thereto. The display device may be provided not in the driver's cab but in an external device that gives instructions to the working machine. The amounts of radiation may be provided not in the form of display but in the form of voice. The radiation may be indicated by direct numerical values or only by colors at the display device.

In the present embodiment, mapping associating the total amounts of radiation Ct with the detection areas MA of the object W of detection, such as the structure BB to be demolished, can be displayed at the display device 180. Thus, a level of such an amount of radiation can be determined for each of the detection areas MA. Therefore, in demolishing the object W of detection, a required space to dispose waste resulting from the demolition, its demolition procedure, or the like can be predicted before starting the demolition. That is, there is no need to separately check the demolition procedure or the amounts of radiation after the demolition, thereby enabling an improvement in working efficiency. Note that the present invention is not limited thereto. No mapping display for the total amounts of radiation Ct may be provided.

That is, the use of the radiation detecting attachment 140 in the present embodiment makes it possible to use the radiation detectors 162 and 164 efficiently and in a versatile manner.

While the present invention has been described with reference to the first embodiment, the present invention is not limited to the first embodiment. That is, it is needless to say that modifications and design changes are possible without departing from the scope of the present invention.

Figure 8A:
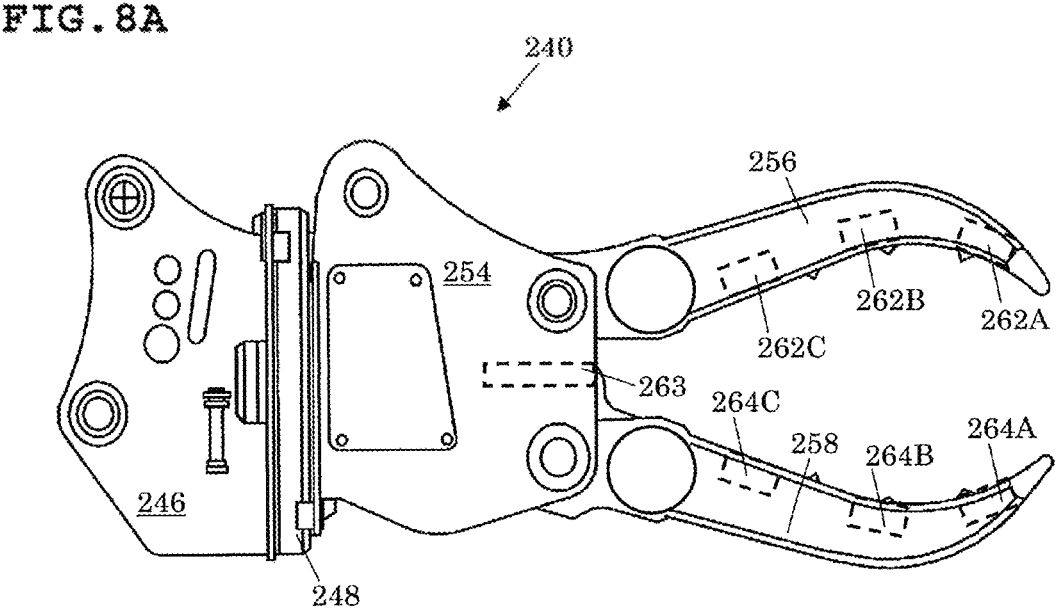
FIG. 8A is a side view showing radiation detecting attachments according to a second embodiment of the present invention.
Figure 8B:
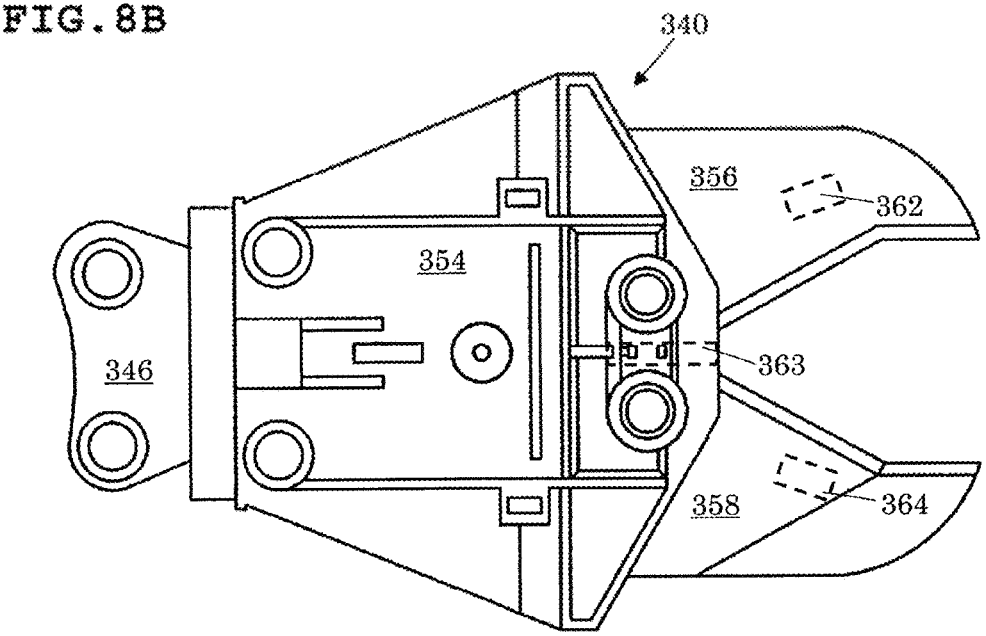
FIG. 8B is a side view showing radiation detecting attachments according to a third embodiment of the present invention.

For example, while the radiation detecting attachment 140 includes the four radiation detectors 162 and 164 and a clearance between the radiation detector 162 and the radiation detector 164 is changeable in the x-direction on the x-y plane in the above-described embodiment, the present invention is not limited thereto. For example, the radiation detecting attachment may be configured as in a second embodiment and a third embodiment shown in FIGS. 8A and 8B, respectively. In the second and third embodiments, radiation detecting attachments each include a plurality of claw members capable of coming closer to each other and separating from each other. Specifically, in the second embodiment shown in FIG. 8A, claw members 256 and 258 provided in a rotating mechanism 248 are grasping members for grasping a specified object, and a radiation detecting attachment 240 constitutes a grapple GP. In the third embodiment shown in FIG. 8B, claw members 356 and 358 are cutting members capable of cutting a specified object, and a radiation detecting attachment 340 constitutes a cutter (the radiation detecting attachment 340 may be high-powered cross cutter CT, normal cross cutter, a crusher, or the like). In such cases, a single radiation detector may be disposed at only any one of a plurality of positions 262A, 262B, 262C, 263, 264A, 264B, and 264C (362, 363, and 364) indicated by broken lines, or radiation detectors may be provided at all of those positions. When a plurality of radiation detectors are disposed in the different claw members 256 and 258 (356 and 358), a clearance between the radiation detectors may be modified by opening and closing the claw members 256 and 258 (356 and 358). With the use of the claw members 256 and 258 (356 and 358) shown in FIGS. 8A and 8B, the radiation detecting attachment 240 (340) can function also as a conventional working attachment such as the cutter or the grapple GP. By grasping the object W of detection with the claw members 256 and 258 (356 and 358), for example, a distance to the object W of detection can be stabilized, and the object W of detection can be accurately identified for the detected amount of radiation. Note that the present invention is not limited thereto. The opening and closing form of claw members may be configured in such a manner that the claw members come closer to one another from a plurality of axial directions as in what is called a tulip shape. Alternatively, the radiation detecting attachment may include a mechanism for discharging water jet capable of cutting a specified object.

While the radiation detecting attachment 140 is supported by the arm body 127 of the working machine 100 swingably in the above-described embodiment, the present invention is not limited thereto. For example, the radiation detecting attachment may be configured as in a fourth embodiment shown in FIG. 9. In the fourth embodiment, a radiation detecting attachment 440 is supported by a linear-motion mechanism 425 so as to be capable of being translated with respect to a turning body 426, rather than being supported by an arm body 427 swingably.

Also, in the fourth embodiment, a working machine 400 is configured to simultaneously include the radiation detecting attachment 440 and a grapple GP capable of supporting an object W of detection and the radiation detecting attachment 440. This enables objects W of detection to be disposed on a conveyor BC with the equipped grapple GP in order to detect radiation. That is, no other working machine is required, and replacement work between the radiation detecting attachment 440 and the grapple GP can be eliminated. Thus, the objects W of detection can be easily moved from the conveyor BC and sorted even in a narrow working site.

Figure 9:
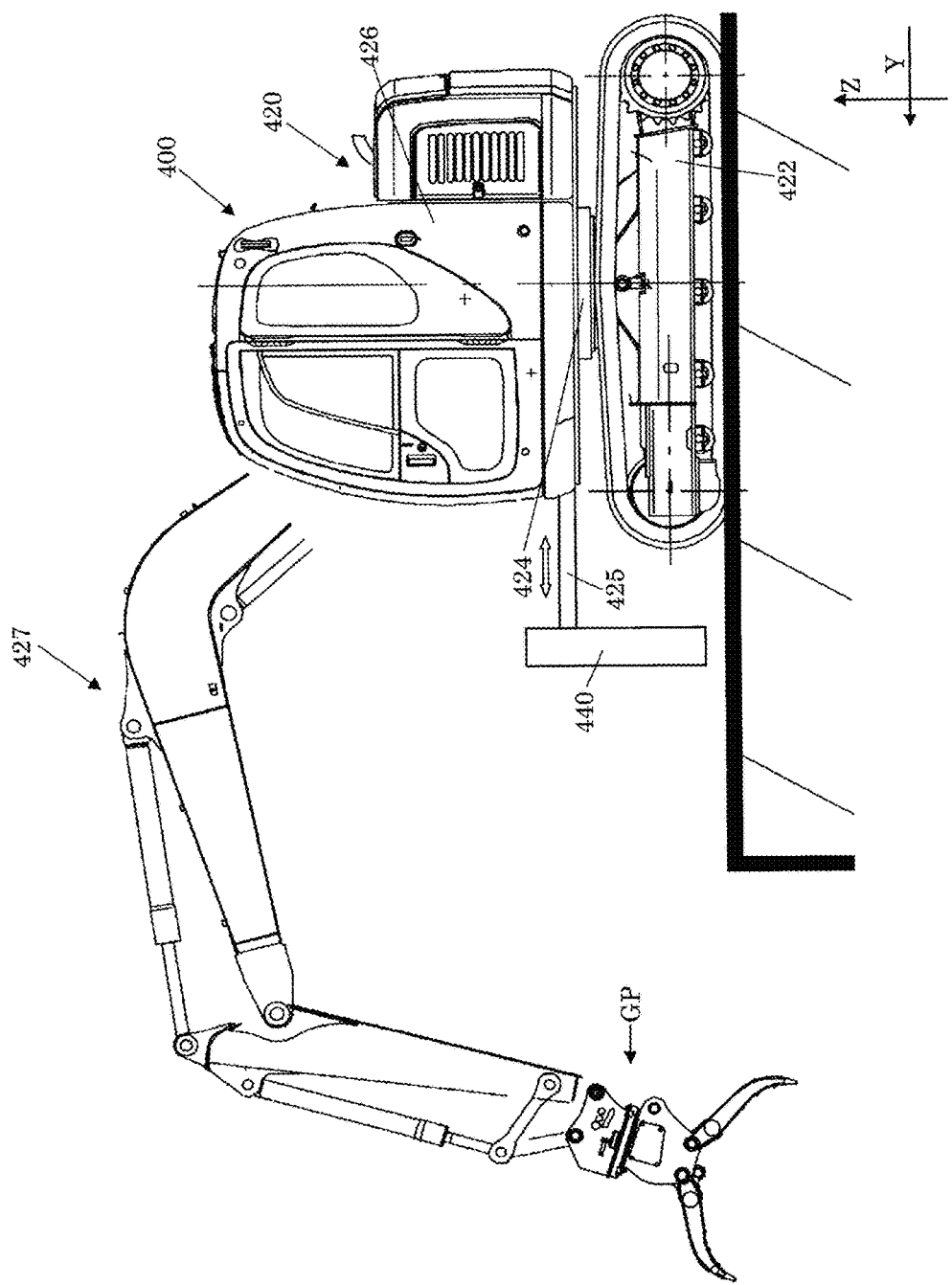
FIG. 9 is a schematic view showing a working machine according to a fourth embodiment of the present invention.

Assume that the working machine 400 includes high-powered cross cutter CT (it may be a cutter) instead of the grapple GP in FIG. 9. In this case, the object W of detection can be divided with the high-powered cross cutter CT in accordance with the obtained amounts of radiation. That is, no other working machine is required, and replacement work between the radiation detecting attachment 440 and the CT can be eliminated. Thus, the objects W of detection can be quickly sorted even in a narrow working site.

Note that the working machine may include a plurality of arm bodies, and the grapple GP (or the high-powered cross cutter CT or the cutter) and the radiation detecting attachment may be supported by the different arm bodies.

While the radiation detectors are scintillation detectors in the above-described embodiment, the present invention is not limited thereto. For example, a fluoroglass dosimeter or a thermoluminescence dosimeter utilizing a fluorescence action, a photographic film, a semiconductor dosimeter, a chemical dosimeter, discharge ionization chamber dosimeter, a GM counter, or the like may be employed as a radiation detector.

INDUSTRIAL APPLICABILITY

The present invention can be widely applied to the demolition industry, the forest industry, the scrap industry, the waste treatment industry, decontamination work, or the like, having a risk of radiation contamination.

REFERENCE SIGNS LIST 100, 101, 102, 400 . . . working machine
120, 420 . . . vehicle body
122, 422 . . . traveling body
124, 424 . . . turning mechanism
126, 426 . . . turning body
126A . . . driver's cab
127, 427 . . . arm body
128 . . . boom
130, 134, 160 . . . cylinder mechanism
132 . . . arm
136 . . . link mechanism
140, 240, 340, 440 . . . radiation detecting attachment
142 . . . pivot shaft
144 . . . link shaft
146, 246, 346 . . . bracket
148 . . . coil spring
150 . . . air pipe
152 . . . hydraulic pipe
154, 254, 354 . . . frame body
156 . . . casing
156A . . . lower surface of casing
156B . . . flow channel
158 . . . moving element
160A . . . cylinder element
160B . . . piston element
162, 164 . . . radiation detector
162A, 164A . . . detection surface
166 . . . discharge nozzle
170 . . . processing device
172 . . . radiation amount computing unit
174 . . . mapping processing unit
176 . . . sorting determination unit
180 . . . display device
182 . . . display unit
248 . . . rotating mechanism
256, 258, 356, 358 . . . claw member
262A, 262B, 262C, 263, 264A, 264B, 264C, 362, 363, 364 . . . position (where a radiation detector may be disposed)
425 . . . linear-motion mechanism
Ab . . . pre-replacement air
Af . . . post-replacement air
BB . . . structure to be demolished
BC . . . conveyor
CT . . . high-powered cross cutter CV . . . box-shaped cover
FP . . . flexible container pack
GP . . . grapple
MA . . . detection area
PL1, PL2 . . . placement location
W . . . object of detection

The invention claimed is:

1. A radiation detecting attachment comprising one or more radiation detectors configured to detect radiation from an object of detection, attached removably to a working machine, wherein
the radiation detecting attachment is supported by the working machine movable when the radiation detecting attachment is attached to the working machine, when a plurality of the radiation detectors are included, comprising a frame body supporting the plurality of the radiation detectors, and a distance between at least one radiation detector and another radiation detector is changeable by moving of a moving element included the frame body.

2. The radiation detecting attachment according to claim 1, comprising a plurality of claw members capable of coming closer to each other and separating from each other.

3. The radiation detecting attachment according to claim 1, wherein the radiation detecting attachment is supported by an arm body of the working machine swingably.

4. The radiation detecting attachment according to claim 1, wherein at least one of the radiation detectors is supported via an elastic member.

5. The radiation detecting attachment according to claim 1, comprising one or more discharge nozzles disposed to be capable of replacing pre-replacement air between the radiation detector and a detection area of the object of detection, wherein
post-replacement air having a reduced amount of a radioactive substance contained in the pre-replacement air is discharged from the one or more discharge nozzles.

6. The working machine to which the radiation detecting attachment according to claim 1 is attached.

7. The working machine according to claim 6, comprising a driver's cab equipped with a display device capable of displaying an amount of radiation based on an output of the radiation detector.

8. The working machine according to claim 7, wherein the display device can display mapping associating the amount of radiation with the detection area of the object of detection.

9. A radiation detecting attachment comprising one or more radiation detectors configured to detect radiation from an object of radiation, attached removably to a working machine, wherein
the radiation detecting attachment is supported by the working machine movably when the radiation detecting attachment is attached to the working machine, comprising a plurality of claw members capable of coming closer to each other and separating from each other.

10. The radiation detecting attachment according to claim 9, wherein
when a plurality of the radiation detectors are included, a distance between at least one radiation detector and another radiation detector is changeable.

11. A sorting method for sorting, with a radiation detecting attachment including one or more radiation detectors configured to detect radiation from an object of detection, attached removably to a working machine, the object of detection on a basis of an amount of the radiation, the method comprising:
a step of supporting the radiation detecting attachment by the working machine and bringing the radiation detecting attachment closer to each of detection areas of the object of detection;
a step of obtaining an amount of radiation of the detection area on a basis of an output of the radiation detector;
a step of detaching the radiation detecting attachment from the working machine and attaching a working attachment, capable of dividing the object of detection into each of the detection areas, to the working machine; and
a step of dividing the object of detection with the working attachment in accordance with the obtained amount of radiation.

12. The sorting method according to claim 11, comprising: a step of replacing pre-replacement air between the radiation detector and the detection area with post-replacement air having a reduced amount of a radioactive substance contained in the pre-replacement air before obtaining the amount of radiation of the detection area.

13. The sorting method according to claim 11, comprising a step of displaying mapping associating the obtained amount of radiation with the detection area.

14. A sorting method for sorting, with a radiation detecting attachment including one or more radiation detectors configured to detect radiation from an object of detection, attached removably to a working machine, the object of detection on a basis of an amount of the radiation, the method comprising:
a step of preparing a conveying unit capable of conveying a plurality of the objects of detection;
a step of detaching the radiation detecting attachment from the working machine and disposing the radiation detecting attachment near the conveying unit so that radiation of the plurality of the objects of detection moving on the conveying unit can be detected sequentially; and
a step of obtaining an amount of radiation for each of the plurality of the objects of detection moving on the conveying unit.

15. The sorting method according to claim 14, comprising a step of replacing, when obtaining the amount of radiation for each of the objects of detection, pre-replacement air between the radiation detector and the object of detection with post-replacement air having a reduced amount of a radioactive substance contained in the pre-replacement air.

16. The sorting method according to claim 14, comprising:
a step of detaching the radiation detecting attachment from the working machine and attaching a working attachment, capable of supporting the object of detection, to the working machine; and
a step of disposing the plurality of the objects of detection on the conveying unit with the working attachment in order to detect the radiation.

17. The sorting method according to claim 14, comprising, when the working machine simultaneously includes the radiation detecting attachment and a working attachment capable of supporting the object of detection, a step of disposing the plurality of the objects of detection on the conveying unit with the equipped working attachment in order to detect the radiation.

18. The sorting method according to claim 14, comprising a step of displaying the obtained amount of radiation for each of the objects of detection.

19. The sorting method according to claim 14, comprising a step of sorting the object of detection with the working attachment in accordance with the obtained amount of radiation.

* * * * *